US009087318B1

(12) United States Patent
Cordes et al.

(10) Patent No.: US 9,087,318 B1
(45) Date of Patent: Jul. 21, 2015

(54) VISUALLY READABLE ELECTRONIC LABEL

(71) Applicant: Sprint Communications Company L.P., Overland Park, KS (US)

(72) Inventors: Kevin R. Cordes, Lee's Summit, MO (US); Clinton Harry Loman, Raymore, MO (US); Lyle W. Paczkowski, Mission Hills, KS (US); Kenneth Ray Steele, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/076,164

(22) Filed: Nov. 8, 2013

(51) Int. Cl.
*G06K 19/07* (2006.01)
*G06Q 10/08* (2012.01)
*G06K 19/077* (2006.01)

(52) U.S. Cl.
CPC ...... *G06Q 10/0875* (2013.01); *G06K 19/07707* (2013.01); *G06K 19/07758* (2013.01)

(58) Field of Classification Search
USPC .................................. 235/375, 492, 385, 487
See application file for complete search history.

(56) References Cited

U.S. PATENT DOCUMENTS

| 6,177,860 | B1 | 1/2001 | Cromer et al. | |
|---|---|---|---|---|
| 7,366,806 | B2 | 4/2008 | Milenkovic et al. | |
| 8,718,554 | B2 | 5/2014 | Abel | |
| 8,811,971 | B2 | 8/2014 | Corda et al. | |
| 2006/0258289 | A1 | 11/2006 | Dua | |
| 2008/0198098 | A1* | 8/2008 | Gelbman et al. | 345/59 |
| 2008/0303637 | A1* | 12/2008 | Gelbman et al. | 340/10.42 |
| 2011/0063093 | A1 | 3/2011 | Fung et al. | |
| 2012/0150601 | A1 | 6/2012 | Fisher | |
| 2012/0184367 | A1* | 7/2012 | Parrott et al. | 463/31 |
| 2012/0196586 | A1 | 8/2012 | Grigg et al. | |
| 2012/0262281 | A1* | 10/2012 | Edwards et al. | 340/10.42 |

OTHER PUBLICATIONS

Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Cordes, Kevin R., et al., "Prevention of Inductive Coupling Between Components of a Mobile Communication Device", filed Apr. 30, 2013, U.S. Appl. No. 13/873,813.

(Continued)

*Primary Examiner* — Christle I Marshall

(57) ABSTRACT

A visually readable electronic label is disclosed. The system comprises a radio frequency identity (RFID) component that is operable to store data, an antenna coupled to the radio frequency identity component that is operable for deriving electrical power from an incident radio frequency field, where the derived electrical power is the sole electrical power available to the electronic label and a display coupled to the radio frequency identity component that is operable to present a visual indication of the data when commanded by the radio frequency identity component and when electrical power derived from an incident radio frequency field is available.

20 Claims, 5 Drawing Sheets

(56) References Cited

OTHER PUBLICATIONS

Cordes, Kevin R., et al., "Autonomous Authentication of a Reader by a Radio Frequency Identity (RFID) Device", filed Feb. 27, 2014, U.S. Appl. No. 14/192,316.

Loman, Clint H., et al., "Radio Frequency Induced Power Reception Management for a Radio Frequency Identity (RFID) Chip Embedded in a Mobile Communication Device," filed Nov. 4, 2014, U.S. Appl. No. 14/532,954.

Restriction Requirement dated Jan. 5, 2015, U.S. Appl. No. 13/857,139, filed Apr. 4, 2013.

FAIPP Pre-Interview Communication dated Mar. 2, 2015, U.S. Appl. No. 13/857,138, filed Apr. 4, 2013.

First Action Interview Office Action dated Apr. 20, 2015, U.S. Appl. No. 13/857,138, filed Apr. 4, 2013.

Cordes, Kevin R., et al., entitled, "Virtual Private Network (VPN) Tunneling in a User Equipment (UE) Brokered by a Radio Frequency Identity (RFID) Chip Communicatively Coupled to the User Equipment," filed Apr. 27, 2015, U.S. Appl. No. 14/696,835.

\* cited by examiner

VISUALLY READABLE ELECTRONIC LABEL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Order fulfillment of mobile communication devices for large businesses involves a supply chain process that comprises inventory management and brand management. Inventory management of the mobile communication devices may be done via an assigned stock-keeping unit (SKU) provided by the original equipment manufacturers (OEM) when the inventory arrives at the warehouse. Managing the branding of the mobile communication device when the inventory leaves the warehouse to ship to the retail stores or to the warehouse of another distributor may involve many different touch points and may be labor intensive.

SUMMARY

In an embodiment, a visually readable electronic label, which may be also referred to herein as a human readable electronic label, is disclosed. The system comprises of a radio frequency identity (RFID) component that is operable to store data. In addition, the system comprises of an antenna coupled to the radio frequency identity component that is operable for deriving electrical power from an incident radio frequency field, where the derived electrical power is the sole electrical power available to the visually readable electronic label. In addition, a display coupled to the radio frequency identity component that is operable to present a visual indication of the data when commanded by the radio frequency identity component and when electrical power derived from an incident radio frequency field is available.

In another embodiment, a method of transmitting an indication of a brand to a visually readable electronic label electronic label affixed to an inventory pallet or a master carton or an individual box is disclosed. The method comprises broadcasting by a scanning device a radio frequency command signal that radiates a plurality of visually readable electronic label, wherein each label comprises at least one display area, a radio frequency identity chip, and an antenna operable for deriving electrical power from the radio frequency command signal. The derived electrical power is the sole electrical power available to the label, and wherein the command signal directs the radio frequency identity chip of each label to store an indication of brand. The method also comprises of determining by the scanning device by communicating with each of the radio frequency identity chips which of the radio frequency identity chips successfully stored the indication of brand and shipping a plurality of mobile communication devices associated with the package or with the inventory pallet.

In another embodiment, a method of changing an indication of a brand of a visually readable electronic label affixed to a package or an inventory pallet is disclosed. The method comprises reading a brand indication by a scanning device from a plurality of visually readable electronic labels, wherein each label comprises at least one display area, a radio frequency identity chip that stores the brand indication, and an antenna operable for deriving electrical power from a radio frequency signal radiated by the scanning device, where the derived electrical power is the sole electrical power available to the label. Then based on reading the brand indications, transmitting a command by the scanning device to at least some of the visually readable electronic label to change their brand indication and determining by the scanning device by communicating with the at least some of the visually readable electronic labels which of the visually readable electronic labels successfully changed their brand indication. The method also includes provisioning a wireless communication network to associate the changed brand with the at least some of the visually readable electronic labels, wherein the package or inventory pallet carry one or more mobile communication devices.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
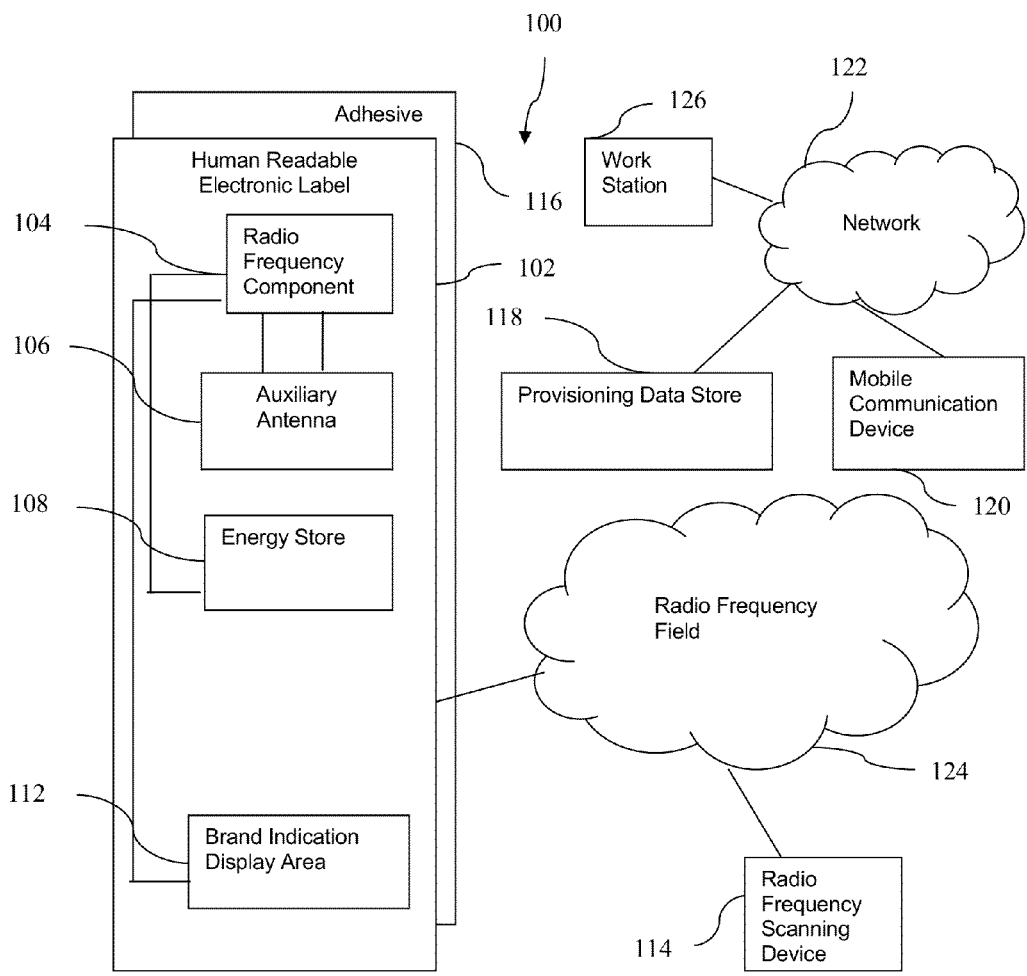
FIG. 1 is an illustration of a human readable electronic label reading and writing system according to an embodiment of disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In order fulfillment, for example sales order filling, the logistics process begins with the inventory being received at a warehouse from the original equipment manufacturers (OEM). Each device may be assigned a stock-keeping unit (SKU) which serves as a unique identification for the device model and brand. In an embodiment, the device is configured to be readily changed to a different brand. A device may ship in a box. In some contexts, this box may be referred to as a point-of-sale box. A plurality of point-of-sale boxes may be shipped inside a bigger box, which may be referred to in some contexts as a master carton. As an example, 5 point-of-sale boxes may be shipped in a master carton or some other number of point-of-sale boxes. Many master cartons are in turn shipped inside or on one inventory pallet. When a brand indicator is imprinted on the inventory pallet, carton and the box of the device, in the event the brand indication needs to be reassigned, the boxes and therefore cartons may need to be opened and re-tagged with a new brand which may make the process labor intensive. In addition, there may be room for human error in assigning the correct brand identity to the box, the carton and the inventory pallet where the brand name could be mislabeled on the pallet, the carton or the box. When labeling a few cartons or boxes as a brand different than the brand of other cartons or boxes in the same pallet, the probability of human error occurring may increase.

The present disclosure teaches a system and a method by which the re-branding of the boxes, cartons and pallets is facilitated when a human readable electronic label changes brand assignment and/or indication in response to a radio frequency signal, for example a signal transmitted by a radio frequency transmitter and/or scanner. In an embodiment, the human readable electronic label comprises a radio frequency component, an antenna, an optional energy store, and a brand indication display area along with an adhesive to help affix the label to a surface.

For example, when mobile communication devices in an inventory pallet are to be rebranded, a radio frequency scanner transmits a radio frequency command signal instructing the human readable electronic labels associated with the entire pallet to change the brand assignment stored in the labels. The labels may also respond to the signal by visually displaying an indication of the changed brand. Alternatively, the radio frequency scanner may transmit a separate command to cause the labels to visually display the indication of the changed brand, for example a visual display that is readable by a human being. It is understood that the brand assignment stored in the labels may be different from the brand assignment stored by the devices themselves or the devices themselves may not store any brand assignment initially. In an embodiment, the assignment of a brand to the devices themselves may be deferred until the devices are activated for service, whereupon the brand assignment is conferred to the devices by a wireless communication network, for example based on provisioning information stored in the wireless communication network.

The human readable electronic labels that are affixed on the inventory pallet, the cartons within the pallet, and the point-of-sale boxes that contain the mobile communication devices (in the cartons) receive the transmitted radio frequency signal from the scanner through the radio frequency component of the labels. The human readable electronic labels may not comprise any battery and may receive electrical power from a power field radiated by the radio frequency scanner and received by one of the antennas of the label. The human readable electronic labels may have areas where information is imprinted. But the human readable electronic labels also have a display area, for example a brand indication display area, that is communicatively coupled with the radio frequency component and which can display an indication of a brand associated with the device or devices, for example when commanded by the radio frequency scanner and when energized by a radiated radio frequency power field by the radio frequency scanner.

In an embodiment, the human readable electronic labels may be configured to receive and respond to two commands from the radio frequency scanner—to change a brand assignment stored by the label and to present an indication of the brand assignment. Note that the indication of the brand assignment may be very simple, such as the display of a dot in one of four grid areas of the brand indicator display, where the different grid areas are associated with different brand assignments. Also note that the term "brand assignment," with reference to storage of brand assignment by the label, can be as simple as storing which of four different expressions of brand indication the display is capable of presenting. The concept of brand assignment stored by the label need not involve the label storing an alphanumeric string spelling out the name of a wireless communication service provider name or a code associated with such a service provider.

In an embodiment, when a brand assignment command is transmitted to a human readable electronic label, the radio frequency component of the label may transmit an acknowledgement to the radio frequency scanner. Alternatively or additionally, in an embodiment, the label may configured to respond to a third command from the radio frequency scanner—to confirm the brand assignment stored by the label by transmitting information about the brand assignment back to the radio frequency scanner. If the label has not changed brand assignment properly in response to a brand assignment command, the radio frequency scanner may detect this and retransmit the brand assignment command to the subject label. In an embodiment, the brand assignment command and/or the brand indication presentation command may address and/or identify one or more specific human readable electronic labels by specifying an address, a range of addresses, an identity, or a range of identities that select one or more associated labels. The selected labels respond to the commands and non-selected labels ignore the commands.

In an embodiment, the human readable electronic label is flexible and conforms to a cylindrical object, for example to a drum. The labels may be adhered to a continuous or long strip of backing material that is then wrapped on a cylinder or drum for shipping and/or dispensing. In an embodiment, the cost of the human readable electronic labels is anticipated to be 10 cents per label or less. It is contemplated that the human readable electronic labels may be manufactured in production quantities of hundreds of thousands and/or millions of units.

In an embodiment, the human readable electronic label further comprises an auxiliary antenna addition to the radio frequency component's antenna. The auxiliary antenna may be configured to capture electrical power from a radio frequency signal radiated by the radio frequency scanner. In an embodiment, the radio frequency scanner may radiate the power signal at the same frequency that it transmits commands to the radio frequency component of the human readable electronic labels. The auxiliary antenna may be larger and/or longer than the antenna coupled to the radio frequency component in order to capture more radiated electrical power. Alternatively, the radio frequency scanner may radiate the power signal at a different frequency from the frequency on which it transmits commands to the radio frequency component of the human readable electronic labels. In an embodiment, the separation of the frequency of the power signal from the command signal by the radio frequency scanner may promote transmitting the power signal at a power level that is unfeasible (e.g., might damage the radio frequency component of the label) for the command signal.

In an embodiment, the human readable electronic label may comprise one or more energy storage components, such as components that store energy in an electrical field or in a magnetic field. For example, the label may comprise one or more capacitors that store energy in an electric field and/or one or more inductors that store energy in a magnetic field. In an embodiment, the radio frequency component may be implemented as a radio frequency identity (RFID) chip. While much of the description herein describes the use of the human readable electronic label in an application of dynamic brand management, it is understood that the human readable electronic label may have other applications independent of the dynamic brand management use case.

When a brand indication display command from the radio frequency scanner is received by the human readable electronic label, the brand indication display may present an indication of the stored brand assignment. In one embodiment, the display area may contain a specific pattern for a specific brand or may turn a certain color for a specific brand. Alternatively, the display area may have four by four squares and a dot placed in a specific location may indicate a brand. This offers 16 different possibilities for brand and is scalable based on the need of the re-branding initiative. In some embodiments, the display area of the label may contain patterns, and each pattern may correspond to a certain brand. In an embodiment, the brand indication display may be an electroluminescent display that retains and presents a visual indication of a brand even when unpowered. In an embodiment, the brand indication display may need to be electrically powered to change the electroluminescent display indication. In some embodiments (e.g., when a display that is not an electroluminescent display is used) presentation of the brand indication by the brand indication display depends on the power that can be derived from the energy irradiated to the radio frequency component and/or to the auxiliary antenna and what could potentially be stored in the electrical field energy store or magnetic field energy store via a capacitor, an inductor integral with and/or attached to the radio frequency component, auxiliary antenna, and/or label. The human readable electronic label may be affixed on the inventory pallet, the carton and the box carrying the mobile communication device or other product. In an embodiment, the human readable electronic label may be fixed to the inventory pallet, carton or box with an adhesive. In some cases, the human readable electronic label may be part of a transparent sleeve.

Being able to read brand indications, by a human being, on the label promotes selecting product for usage, for sale, or for shipment according to the associated brand. For example, a salesman at a retail store can pick a particular model of mobile phone destined to be activated as a first brand for a first customer based on the human readable indication of the first brand presented by the label and can pick the same particular model of the mobile phone destined to be activated instead as a second brand for a second customer based on the human readable indication of the second brand presented on the label. Being able to change the assignment and/or indication of brand of the labels using a radio frequency command transmitted by a scanner may be more convenient, less expensive, less error prone than having human operators open boxes and affixing static brand labels onto point of sale boxes to change the initial brand assignments. Also, in cases where a retailer returns shipments of unsold merchandise, the human readable electronic labels can be assigned conveniently to different brands, for example to a brand that is experiencing higher customer demand at present.

Turning now to FIG. 1, a human readable electronic label reading and writing system 100 is described. In an embodiment, the system 100 comprises a human readable electronic label 102. The human readable electronic label 102 comprises a radio frequency component 104, and an optional energy store 108 which stores energy received by the radio frequency component 104. It is understood that the radio frequency component 104 comprises an antenna. In another embodiment, an auxiliary antenna 106, in addition to the antenna in the radio frequency component 104, is provided. The human readable electronic label 102 also comprises a brand indication display area 112 which is communicatively coupled to the radio frequency component 104. The display area 112 may be an electroluminescent display or a different kind of display. The human readable electronic label 102 may have an adhesive 116 which is used to affix the label 102 to a surface, for example, a box, a carton and/or a pallet. Alternatively, the label may be secured or affixed by slipping into a clear sleeve that is attached to a box, carton, or pallet; the label 102 may be secured by a bracket or clip; or the label 102 may be secured and/or attached with other structures.

While the human readable electronic label 102 is described below in a use case that supports dynamic branding and rebranding of electronic devices, for example branding and rebranding of mobile communication devices, it is understood that other applications of and use cases for the human readable electronic label 102 are contemplated by the present disclosure. For example, in an embodiment, the human readable electronic label 102 may be advantageously applied to identifying food products, for example sources of a food product that may be sourced from different producers and/or different countries, for example, blueberries sourced from Argentina, blueberries sourced from Texas, or blueberries sourced from Canada. For example, the human readable electronic label 102 may be advantageously applied to identifying personal items stored among like items belonging to others. In other use cases, the label 102 may be used to populate a coding system for inventory management or filing.

In another embodiment, at a retail location, boxes with green labels (e.g., labels whose display area 112 present a green color) go together on the top shelf whereas the boxes with red labels (e.g., labels whose display area 112 present a red color) may be on the middle shelf. Other examples of use of the labels may be populating perishable dates on goods; dates of tags issued by the department of motor vehicles where the yearly tags could be populated with the current year after appropriate checks are completed for a vehicle.

In another embodiment, the display area 112 may be used to show a security key or a portion of a security key for a container or package. A lock may secure the container or package, and when an authorized reader radiates the label 102 associated with the container or package (e.g., a radio frequency transmitter of the authorized reader transmits a radio frequency signal commanding the label 102 to present the security key or portion of the security key), the display area 112 presents the security key or the portion of the security key that a user may use to unlock the lock. This may allow a user or employee to work with a plurality of locks without resorting to writing down the security keys, which may be a bad security practice. This embodiment could support changing the security key of the lock.

In another embodiment, the label 102 may be used in status management of component parts, for example in an automobile shop. If an automotive component, for example an electric starter, is known to be failed, the label 102 may be assigned a status associated with the display area 112 presenting a red color. If the electric starter needs to be tested, the label 102 may be assigned a status associated with the display area 112 presenting a yellow color. If the electric starter is determined to be good (starting of the subject automobile failed not because of the electric starter being failed but instead due to a break in the electrical wire to the electric starter), the label 102 may be assigned a status associated with the display area 112 presenting a green color. When a worker in the auto shop wants to determine the status of the electric starter, the worker uses a radio frequency scanning device to command the label 102 to present status on the display. It is understood that the label 102 is contemplated to have application to other uses cases as well.

The system 100 may further comprise a radio frequency scanning device 114. The radio frequency scanning device 114 interacts with the human readable electronic label 102 through the radio frequency field 124. The radio frequency scanning device 114 is able to communicate with the human readable electronic label 102 over a relatively short distance. In an embodiment, the radio frequency scanning device 114 is able to communicate with the label 102 over a distance of at least 2 feet. In an embodiment, the radio frequency scanning device 114 is able to communicate with the human readable electronic label 102 over a distance of at least 8 feet. In an embodiment, the radio frequency scanning device 114 is able to communicate with the human readable electronic label 102 over a distance of at least 15 feet but less than 90 feet. A mobile communication device 120 when arriving at the warehouse may have a stock-keeping unit assigned and brand identification associated to the mobile communication device 120, for example the brand may be associated to the mobile communication device 120 by a provisioning data store in a wireless communication service provider network.

A provisioning data store 118 may be synchronized with the brand identification stored in the human readable electronic label 102 for a point-of-sale box, a master carton, and/or a pallet. The provisioning data store 118 may be kept in sync with the brand identification and/or brand assignment stored in the human readable electronic label 102 or labels. The provisioning data store 118 may be updated using a work station 126 or other communication device via the network 122. When a mobile communication device 120 is shipped to the warehouse, the device has a specific stock-keeping unit (SKU) number and a mobile equipment identifier (MEID) that the original equipment manufacturer (OEM) assigns. The brand of the device may also be assigned at the same time. The brand identification that is assigned to the label 102 may agree with the brand identification associated with the mobile communication device 120 in the provisioning data store 118. When the brand identity for the device is changed, the brand identity mapped to the device in the provisioning data store 118 is changed and the brand identification assigned to the human readable electronic label 102 is changed.

Figure 2:
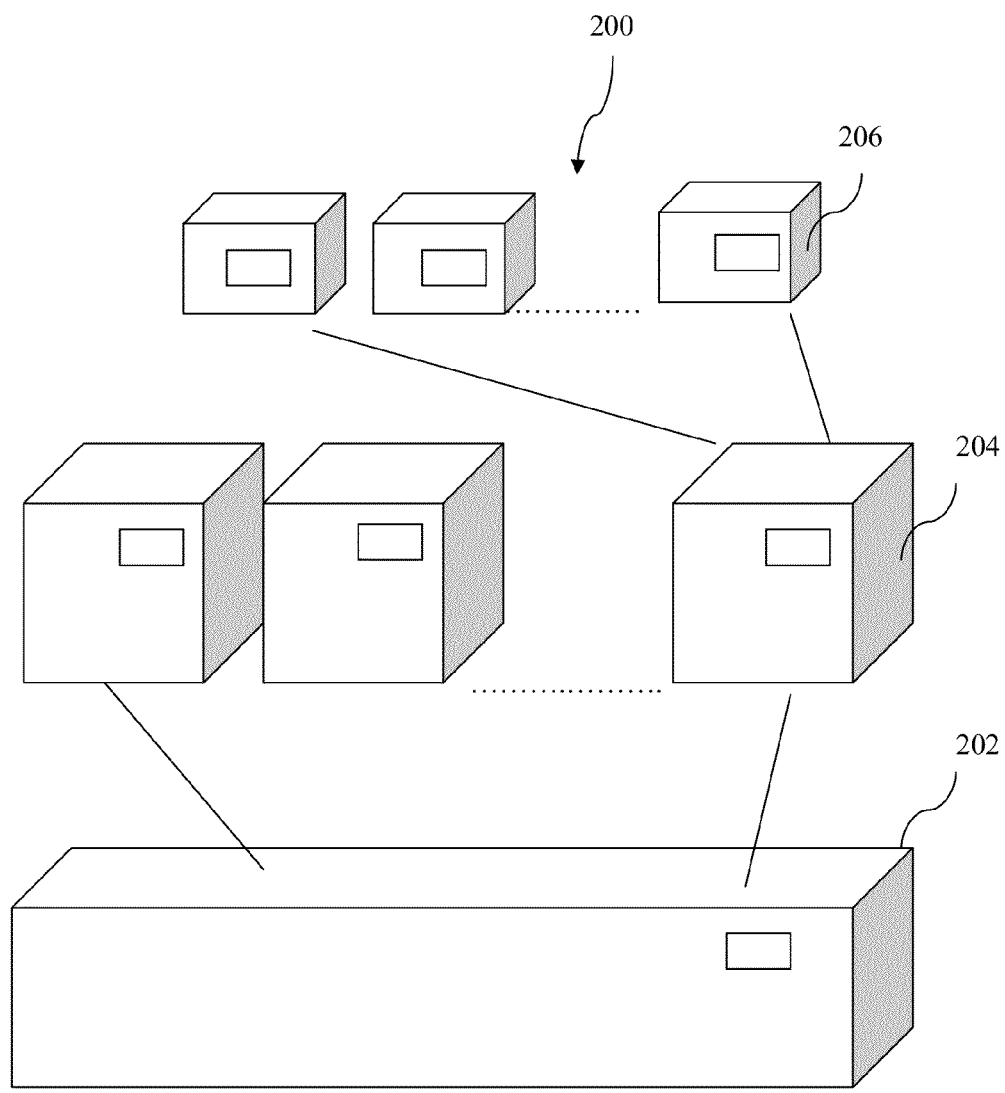
FIG. 2 is an illustration of different levels of packaging of electronic devices according to an embodiment of the disclosure.

Turning to FIG. 2, an illustration of an inventory pallet, a master carton and a point-of-sale box is described. An inventory pallet 202 comprises up to 200 master cartons 204 and each master carton contains up to 5 point-of-sale boxes 206 which each contain a mobile communication device. A human readable electronic label 102 may be affixed by the adhesive to the inventory pallet 202, the master carton(s) 204 and the point-of-sale box(es) 206. In an embodiment, when the radio frequency scanning device 114 transmits a command to change the brand assignment stored in the human readable electronic labels 102 on the inventory pallet 202, on the master carton(s) 204 and on the point-of-sale box(es) 206, as described further above.

The radio frequency scanning device 114 may transmit a command to present an indication of the assigned brand on the display area 112 to the labels 102. In response to receiving this command, the label or labels 102 may present an indication of the assigned brand, for example the brand indication display area 112 may present the indication of the assigned brand. The brand indication presented in the brand indication display area 112, may be a dot in a grid, and the location of the dot within the grid may change in the brand indication display area 112 based on the new brand indication. In some cases, the brand indication may be that of a color in the display area or a specific pattern, for example a checkerboard pattern, a herringbone pattern, a fret pattern, a meander pattern, or other distinctive pattern. In some cases, the brand indication may be an icon associated with the subject brand.

In an embodiment, the human readable electronic label 102 may acknowledge the change in the brand assignment to the radio frequency scanning device 114. If the radio frequency scanning device 114 does not receive an acknowledgement, the radio frequency scanning device 114 can retransmit the command to change the brand assignment to the label or labels 102. In an alternative embodiment, the radio frequency scanning device 114 may transmit a command to present an indication of the brand assignment to the label 102, and the label 102 then responds to the command by presenting the indication of brand assignment in the display area 112. In an embodiment, the radio frequency scanning device 114 may send a command to the label 102 to send a radio frequency signal indicating the brand assignment stored in the label 102, and in response the radio frequency component 104 of the label 102 may transmit information about the brand assignment stored in the label 102 to the radio frequency scanning device 114. In an embodiment, the commands transmitted by the radio frequency scanning device 114 may include an address or identifier that selects one or more of the labels 102. The selected labels 102 may respond to the commands, and unselected labels 102 may ignore the commands.

In an embodiment, the radio frequency scanning device 114 broadcasts a command that all labels 102 that are able to receive the radio frequency command—for example all labels 102 that are within a threshold distance of the radio frequency scanning device 114—respond to the command while other labels 102 that are unable to receive the radio frequency command do not respond. In an embodiment, the radio frequency scanning device 114 may employ a directional radio frequency antenna so that the radio frequency commands can be radiated in a selected direction, whereby to control which labels 102 respond to the command. In an embodiment, pallets 202 may be separated by a radio frequency damping material, whereby a radio frequency transmission from the scanning device 114 to a first inventory pallet 202 is attenuated and/or blocked at a second inventory pallet 202.

In one embodiment, the broadcast from the radio frequency scanning device 114 signals a specific change in the brand indication and only that change is effected on the human readable electronic label 102. For example, the radio frequency scanning device 114 transmits from a distance of 8 feet that a specific brand identification be reflected on the contents of the inventory pallet 202 that is within the range of 8 feet. If there are other inventory pallets within 2 to 8 feet of the radio frequency scanning device 114, the broadcast of the brand indication applies to each of them. The brand identity is stored in the radio frequency component 104. The broadcast then powers the radio frequency component 104 on the plurality of human readable electronic labels 102 on the inventory pallet 202, master carton(s) 204 and the point-of-sale box(es) 206. The auxiliary antenna derives power from the signal, and the coupled brand indication display area 112 reflects the broadcasted brand indication. If there was an old brand indication that was displayed on the label 102, that indication is no longer displayed.

In another embodiment, the change in the brand identification is based on the unique identifier that is transmitted from the human readable electronic label 102, and the radio frequency scanning device 114 then transmits the brand indication that the unique identification will need to change to in a serial manner. For example, the human readable electronic label 102 on master carton 204 in FIG. 2 may transmit a unique identification back to the radio frequency scanning device 114 and the radio frequency scanning device 114 then sends the brand indication that needs to be reflected on the master carton 204. Then the human readable electronic label 102 on the next master carton 204 transmits its unique identification and the radio frequency scanning device 114 determines the brand identification on that carton. The same mechanism is serially executed up to the 200 cartons in a pallet.

In another embodiment, the point-of-sale boxes 206 may carry mobile communication devices 120 with specific mobile equipment identifiers (MEID) that are available as soon as the device 120 is shipped to the order fulfillment warehouse. The radio frequency scanning device 114 may broadcast the change in brand identification to a range of mobile equipment identifiers (MEID) only. At this point, the human readable electronic label 102 on the point-of-sale box 206 with the device that falls in the range of the mobile equipment identifier will change the brand indication to the broadcasted brand indication.

Figure 3:
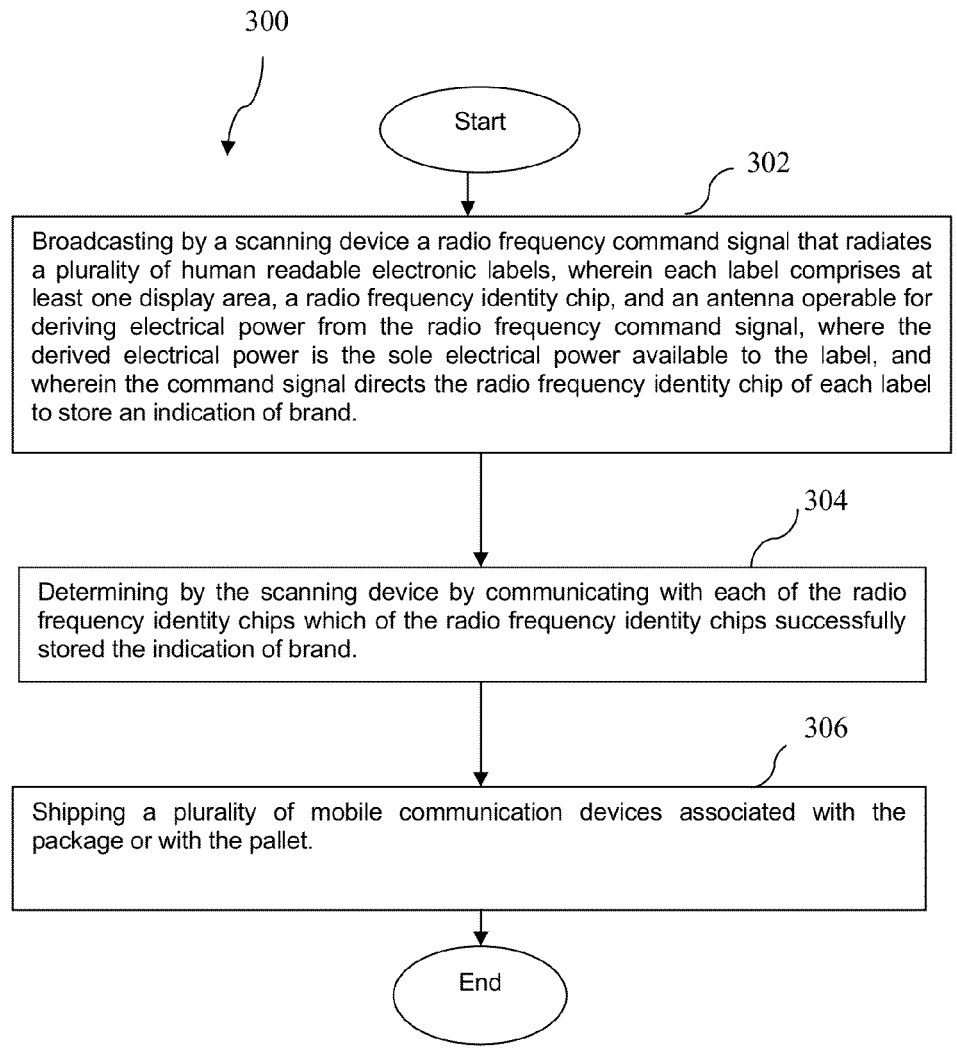
FIG. 3 is a flow chart illustrating a method according to an embodiment of the disclosure.

Turning to FIG. 3, a flow chart of the method 300 is described. At block 302, a scanning device broadcasts a radio frequency command signal that radiates a plurality of human readable electronic labels. Each label comprises at least one display area, a radio frequency identity chip, and an antenna operable for deriving electrical power from the radio frequency command signal, where the derived electrical power is the sole electrical power available to the label. The command signal directs the radio frequency identity chip of each label to store an indication of brand. At block 304, the scanning device determines by communicating with each of the radio frequency identity chips which of the radio frequency identity chips successfully stored the indication of brand. At block 306, a plurality of mobile communication devices is shipped associated with the package or with the pallet.

Figure 4:
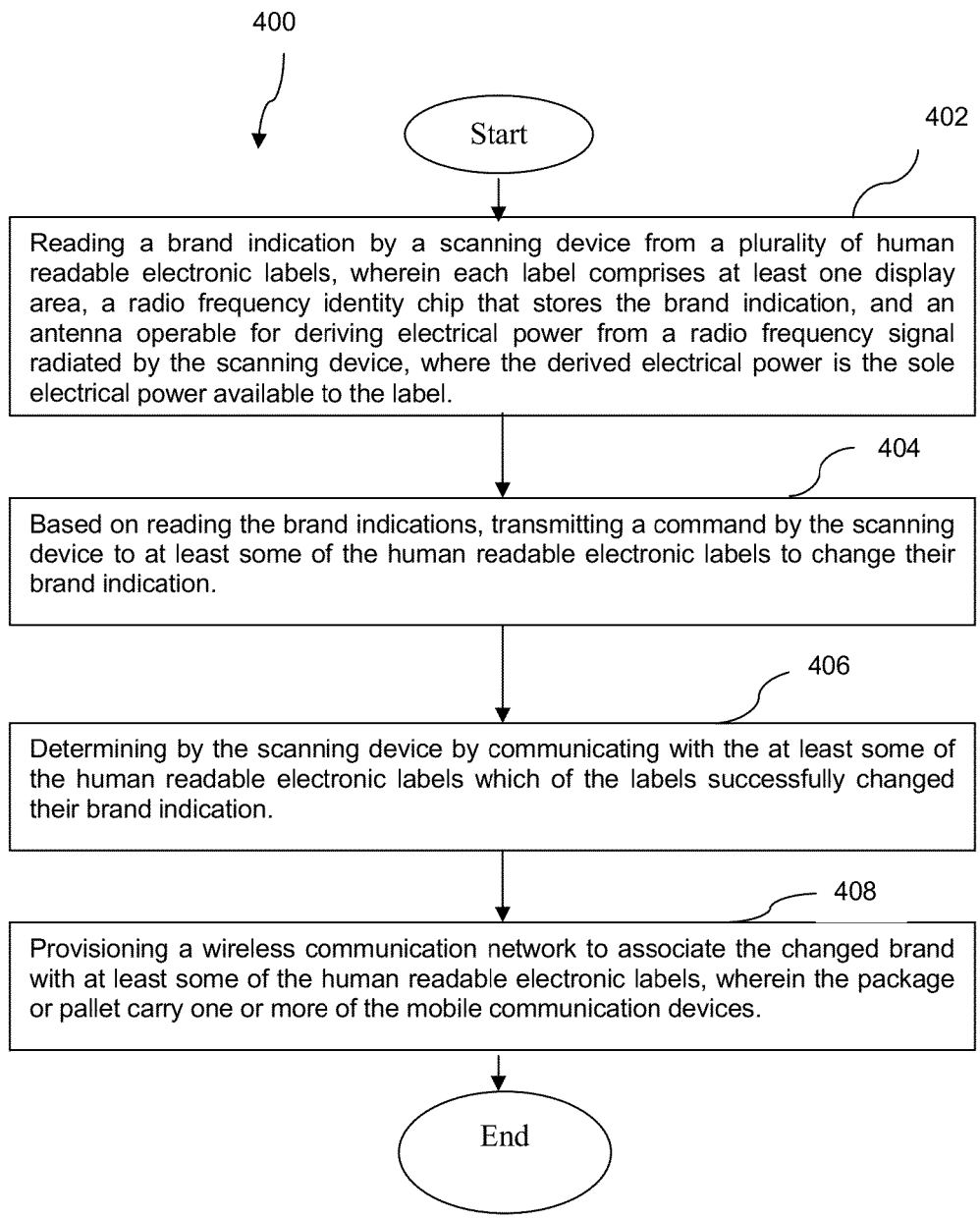
FIG. 4 is a flow chart illustrating another method according to an embodiment of the disclosure.

Turning to FIG. 4 a flow chart of the method 400 is described. At block 402, a scanning device reads a brand indication from a plurality of human readable electronic labels, wherein each label comprises at least one display area, a radio frequency identity chip that stores the brand indication, and an antenna operable for deriving electrical power from a radio frequency signal radiated by the scanning device, where the derived electrical power is the sole electrical power available to the label. At block 404, based on reading the brand indications, the scanning device transmits a command to at least some of the human readable electronic labels to change their brand indication. At block 406, the scanning device determines by communicating with the at least some of the human readable electronic labels which of the human readable electronic labels successfully changed their brand indication. At block 408, a wireless communication network is provisioned to associate the changed brand with at least some of the human readable electronic labels, wherein the package or pallet carries one or more of the mobile communication devices.

Figure 5:
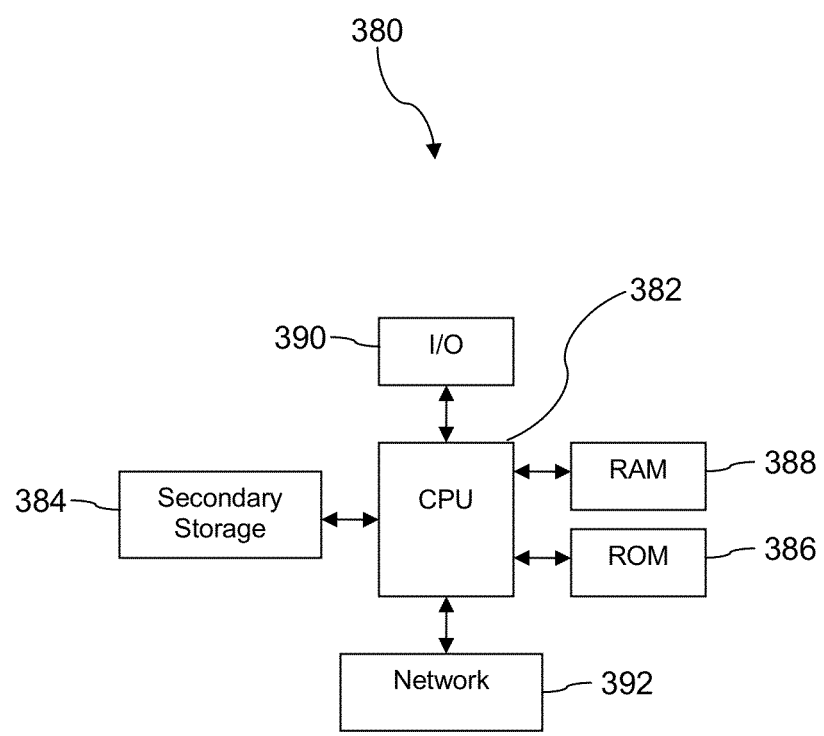
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for changing an indication of a brand using visually readable electronic labels, comprising:
   at least one visually readable electronic label, comprising:
      a radio frequency identity (RFID) component that is operable to store data, an antenna coupled to the radio frequency identity component that is operable for deriving electrical power from an incident radio frequency field, where the derived electrical power is the sole electrical power externally available to the visually readable electronic label, and a display coupled to the radio frequency identity component that is operable to present a visual indication of the data when commanded by the radio frequency identity component and when electrical power derived from an incident radio frequency field is available; and a work station computer of a wireless network provider, comprising:

a network transceiver that communicatively couples the work station to a provisioning data store and the at least one visually readable electronic label, and at least one processor coupled to the network transceiver and configured to:

identify an updated brand indication corresponding to at least one wireless communication device, wherein the at least one visually readable electronic label is associated with the at least one wireless communication device, based on the updated brand indication, change the at least one visually readable electronic label to comprise the updated brand indication via the visual indication of the data on the display, and determine, from a scanning device, that the updated brand indication is successfully stored.

2. The system of claim 1, further comprising an adhesive layer on the back of the at least one visually readable electronic label, wherein the adhesive layer is configured to affix the at least one visually readable electronic label to at least one of a package, a box, or an inventory pallet.

3. The system of claim 1, wherein the at least one visually readable electronic label further comprises an energy storage component coupled to the antenna, wherein the energy storage component stores energy derived from the incident radio frequency field in an electric field, and wherein the display is powered at least in part by discharging the energy stored in the electric field by the energy storage component.

4. The system of claim 1, wherein the data comprises an indication of a brand associated with a wireless communication network, and wherein the visual indication of the data comprises at least one of a color, a pattern, an icon, or a location of a dot in a grid.

5. The system of claim 1, wherein the work station computer is further configured to provision a wireless communication network via the provisioning data store based on the updated brand indication.

6. The system of claim 1, wherein at least a portion of the derived electrical power may be stored in at least one of a capacitor, an inductor, or a battery coupled to the at least one visually readable electronic label, and wherein the display is powered by at least a portion of the stored electrical power.

7. The system of claim 1, wherein the work station computer is further configured to determine the at least one visually readable electronic label comprises an initial brand indication, wherein the initial brand indication is different from the updated brand indication.

8. A method of transmitting an indication of a brand to a visually readable electronic label affixed to a package or a pallet, comprising:

broadcasting by a scanning device a radio frequency command signal that radiates a plurality of visually readable electronic labels, wherein each label comprises at least one display area, a radio frequency identity chip, and an antenna operable for deriving electrical power from the radio frequency command signal, where the derived electrical power is the sole electrical power available to the label, and wherein the command signal directs the radio frequency identity chip of each label to store an indication of brand;

determining by the scanning device by communicating with each of the radio frequency identity chips which of the radio frequency identity chips successfully stored the indication of brand; and shipping a plurality of mobile communication devices associated with the package or with the pallet.

9. The method of claim 8, wherein the mobile communication devices are one of a mobile phone, a personal digital assistant (PDA), a media player, a laptop computer, a tablet computer, or a notebook computer.

10. The method of claim 8, further comprising broadcasting by the scanning device a radio frequency command signal directing the radio frequency identity chip of each label to present a visual indication of the stored indication of brand on the display area.

11. The method of claim 8, wherein the scanning device is located at least 2 feet from the package or pallet.

12. The method of claim 11, wherein the scanning device is located at least 8 feet from the pallet.

13. The method of claim 8, wherein the antenna operable for deriving electrical power from the radio frequency command signal of each label extends along at least an inch of the label.

14. The method of claim 8, further comprising rebroadcasting by the scanning device the radio frequency command signal to each of the radio frequency identity chips that did not successfully store the indication of brand.

15. A method of changing an indication of a brand of a visually readable electronic label affixed to a package or a pallet, comprising:

reading a brand indication by a scanning device from a plurality of visually readable electronic labels, wherein each label comprises at least one display area, a radio frequency identity chip that stores the brand indication, and an antenna operable for deriving electrical power from a radio frequency signal radiated by the scanning device, where the derived electrical power is the sole electrical power available to the label;

based on reading the brand indications, transmitting a command by the scanning device to at least some of the visually readable electronic labels to change their brand indication;

determining by the scanning device by communicating with the at least some of the visually readable electronic labels which of the visually readable electronic labels successfully changed their brand indication; and provisioning a wireless communication network to associate the changed brand with the at least some of the visually readable electronic labels, wherein the package or pallet carry one or more mobile communication devices.

16. The method of claim 15, further comprising transmitting a command by the scanning device to the at least some of the visually readable electronic labels to present a visual indication of the stored indication of brand in the display area.

17. The method of claim 15, further comprising reading unique identifiers associated with at least some of the electronic labels, wherein transmitting the command by the scanning device to at least some of the visually readable electronic labels to change is performed serially, one label at a time, based on the unique identifiers.

18. The method of claim 16, further comprising of visually readable electronic labels listening to the broadcast command by the scanning device and changing the brand indication only when the broadcast range includes the unique identifier associated with the electronic label.

19. The method of claim 15, wherein the mobile communication devices are one of a mobile phone, a personal digital assistant (PDA), a media player, a laptop computer, a tablet, or a notebook computer.

20. The method of claim 15, wherein the visually readable electronic label on the pallet is transmitting to the scanning device the list of mobile equipment identifiers (MEID), of the packages that is contained within the inventory pallet.

* * * * *